(12) United States Patent
Chennupati

(10) Patent No.: US 12,071,931 B2
(45) Date of Patent: Aug. 27, 2024

(54) UNIVERSAL PROPELLER, OPERATING METHOD AND FAVOURED USE

(71) Applicant: Siva RaghuRam Prasad Chennupati, Unterschleissheim (DE)

(72) Inventor: Siva RaghuRam Prasad Chennupati, Unterschleissheim (DE)

( * ) Notice: Subject to any disclaimer, the term of this patent is extended or adjusted under 35 U.S.C. 154(b) by 0 days.

(21) Appl. No.: 18/006,598

(22) PCT Filed: Jul. 27, 2020

(86) PCT No.: PCT/DE2020/100671
§ 371 (c)(1),
(2) Date: Jan. 24, 2023

(87) PCT Pub. No.: WO2021/018353
PCT Pub. Date: Feb. 4, 2021

(65) Prior Publication Data
US 2023/0287864 A1   Sep. 14, 2023

(51) Int. Cl.
*F03D 3/06* (2006.01)
*B63H 1/08* (2006.01)
(Continued)

(52) U.S. Cl.
CPC ............... *F03D 3/068* (2013.01); *B63H 1/08* (2013.01); *B64C 11/32* (2013.01); *F03D 3/005* (2013.01);
(Continued)

(58) Field of Classification Search
None
See application file for complete search history.

(56) References Cited

U.S. PATENT DOCUMENTS 4,355,956 A    10/1982  Ringrose et al.
4,533,297 A *  8/1985   Bassett ................ F03D 1/0658
                                                          416/11
(Continued)

FOREIGN PATENT DOCUMENTS

CN      105863957 A     8/2016
EP        1626176 A2    2/2006
(Continued)

*Primary Examiner* — Juan G Flores
(74) *Attorney, Agent, or Firm* — Laurence A. Greenberg; Werner H. Stemer; Ralph E. Locher

(57) ABSTRACT

A novel universal propeller has a gearwheel arranged on each rotor blade that is directly operatively connected to a reference gearwheel of a timing gear. The timing gear is operatively connected to a hub gear. The hub gear senses and processes an angular velocity $\omega_n$ of a rotation of the hub. The reference gearwheel and the gearwheels of the rotor blades of the timing gear are configured that the ratio of an angular velocity $\omega_r$ of the reference gearwheel to the angular velocity $\omega_n$ of the rotational movement of the hub is as follows: $\omega_r/\omega_n = 1 \pm (\frac{1}{2})*(S_{rot}/S_r)$, where $S_{rot}$ is a size of the gearwheels and $S_r$ is a size of the reference gearwheel. The present invention is particularly suitable for use in a wind power installation, hydropower installation or an engine of a ship or an aircraft.

17 Claims, 13 Drawing Sheets

(51) Int. Cl.
*B64C 11/32* (2006.01)
*F03D 3/00* (2006.01)
*F03D 3/02* (2006.01)

(52) U.S. Cl.
CPC .......... *F03D 3/02* (2013.01); *F05B 2240/213* (2013.01); *F05B 2250/232* (2013.01); *F05B 2260/5032* (2013.01); *F05B 2260/75* (2013.01)

(56) References Cited

U.S. PATENT DOCUMENTS

| | | | | |
|---|---|---|---|---|
| 4,624,623 | A * | 11/1986 | Wagner | F03D 9/14 416/DIG. 8 |
| 10,451,041 | B2 * | 10/2019 | Yamazawa | F03D 3/005 |
| 2011/0076144 | A1 | 3/2011 | Lucas | |
| 2016/0258420 | A1 * | 9/2016 | Yamazawa | F03D 9/007 |

FOREIGN PATENT DOCUMENTS

| | | | |
|---|---|---|---|
| FR | 1021252 | * | 2/1953 |
| FR | 1021252 | A | 2/1953 |
| GB | 2495745 | A | 4/2013 |
| JP | H10288142 | A | 10/1998 |
| JP | 2018135875 | A | 8/2018 |
| WO | 03062671 | A1 | 7/2003 |
| WO | 2014188289 | A1 | 11/2014 |
| WO | 2017187229 | A1 | 11/2017 |

* cited by examiner

Prior Art

UNIVERSAL PROPELLER, OPERATING METHOD AND FAVOURED USE

FIELD AND BACKGROUND OF THE INVENTION

The present invention relates to a novel universal propeller, comprising a hub that is rotatably mounted on a shaft, wherein, on the hub, there are two rotor blades arranged opposite one another or at least three rotor blades arranged in a star configuration with respect to one another, wherein on the hub each rotor blade is arranged, at the end of its longitudinal axis, at an angle α with respect to the central axis of the shaft in such a way that the longitudinal axis of each rotor blade when rotating through 360° describes the peripheral surface of a right circular cone, and wherein the hub comprises a timing gear enabling the rotor blades to be rotated about their longitudinal axis.

The present invention additionally relates to a method for operating such a universal propeller, and to favored uses.

A propeller (from Latin propellere 'to propel') is a machine element of an engine having blades (referred to in the following as rotor blades) that are usually arranged radially (in the form of a star) around a shaft.

In fluid dynamics or aerodynamics, propellers are used to generate motion in the fluid; or a moving fluid is used to drive the propeller. Typical applications for motion in a fluid are propellers used as screw-propellers for ships. In the case of aircraft, the propeller is sometimes referred to as an air screw-propeller; in the case of helicopters, the propulsion is dominated by the lifting action and in this case the term rotor is used. Typical applications for propellers driven by a moving fluid are wind power installations or hydropower installations, which work according to the same principle, except that, conversely, they extract power from the air flow or water flow instead of generating it for propulsion, or lift (A). Propellers used in such a manner are also called repellers.

Earliest propellers for wind power installations date back to the 11th century and are almost 1000 years old. Even in current wind power installations with a horizontal axis (HAWT), the drag component (W) of the wind energy is lost, and only the lift component (A) is used to generate energy from the air flow. In particular, in order to increase power the rotor diameters have become progressively larger because, according to the circle formula, doubling the rotor blade length quadruples the rotor area. Until the end of the 1990s, the diameter of newly erected installations was usually less than 50 meters; after about 2003, it was usually between 60 and 90 meters. By 2018, the average rotor diameter had increased to 118 meters and the average hub height to 132 meters. A disadvantage of this development is the increase in incidents of damage to wind power installations caused by wind gusts or storm gusts.

So-called Savonius rotors or vertical-axis wind power installations (VAWT) are of a much less projecting design compared to HAWT wind power installations, but only use drag components (W) and thereby waste all of the lift components (A).

In operation, many VAWT installations encounter the problem of only being able to run cost-effectively above a particular wind speed, the so-called start-up or cut-in speed. At wind speeds below the start-up speed, the VAWT installation is put into an idle state, with the control electronics and the actuators, for example for the pitching of the rotor blades, still having to be supplied with electric power, such that the installation becomes a power consumer. In order to counter this problem, known from EP 1 626 176 A2 is a wind power installation, similar to a Savonius rotor, that on its vertically arranged rotor blades provides solar converters for converting solar energy into a form of energy different from solar energy, preferably into electrical energy. The energy generated by the solar converters can advantageously supply the installation at low wind speeds, thereby enabling the installation described to be operated independently of the power grid, even below the start-up speed.

An alternative possible solution to the problem of the start-up speed in the case of VAWT installations is to ensure the best possible alignment of the rotor blades with respect to the flow of wind or fluid. Disclosed for this purpose in WO 2017/187 229 AI is a VAWT installation that comprises a multiplicity of rotor blades which, on the one hand, are angled by 30°-60° relative to the main vertical axis of rotation and, on the other hand, have a special aerodynamic profile intended to generate a so-called "secondary induced flow" that advantageously increases the aerodynamic efficiency of the installation described. The rotor blades themselves in this case are rigidly connected to the hub of the VAWT installation described here. In contrast, known from U.S. Pat. No. 4,355,956 A is a VAWT installation that likewise has rotor blades which are angled from the vertical, but which are not characterized by a special profile, but by their material composition. The rotor blades described are produced from a flexible material and are thus self-trimming to a certain degree, i.e. they can change their direction independently to a certain extent in response to the wind pressure and their own restoring force. Here, too, the rotor blades are rigidly connected to the hub of the VAWT installation described.

Furthermore, known from US 2011/0 076 144 AI and WO 2014/188 289 AI are turbine, or propeller, devices that provide for a mechanical alignment of their rotor blades with respect to the flow of wind, or fluid, respectively. Finally, CN 105 863 957 A and GB 2 495 745 A disclose VAWT installations having rotor blades that are angled with respect to a vertical axis of rotation, in which the angle of attack of the rotor blades can also be mechanically aligned with the wind flow to a certain extent. CN 105 863 957 A provides for independent drives, such as in particular electric motors or a pneumatic drive, for varying the angle of attack of the rotor blades. Finally, GB 2 495 745 A provides for this purpose a planetary gear that is configured to rotate the rotor blades themselves in each case by 180° about their longitudinal axis, relative to the hub, during a 360° rotation of the hub together with the rotor blades arranged thereon. However, the gear configuration provided limits the size ratio of the gearwheels connected to the rotor blades to the central stationary gearwheel, the sun gear, to 2 to 1, which quickly leads to a very large gear expansion and thus, disadvantageously, to a critical hub size when the number of rotor blades is increased. In certain cases, even the arrangement of only three rotor blades on a hub can be problematic in gear designs of the prior art.

SUMMARY OF THE INVENTION

Proceeding from this, the present invention is based on the object of providing a propeller that is an improvement on the prior art, that in particular is more compact than conventional propellers, that at the same time allows the arrangement of as large a number of rotor blades as possible, that preferably uses both lift (A) and drag (W) components and that, particularly preferably, is suitable for universal use both for the generation of energy by wind or water power and as a drive for ships or aircraft.

This object is achieved by a universal propeller having the features as claimed. Further advantageous refinements and developments, which can be applied individually or in combination with one another, are provided by the dependent claims.

The universal propeller according to the invention is distinguished from generic propellers by the fact that arranged on each rotor blade there is a gearwheel that is directly operatively connected to a reference gearwheel of the timing gear, the timing gear is operatively connected to a hub gear, wherein the hub gear is configured to sense and process an angular velocity $\omega_n$ of a rotational movement of the hub, and the reference gearwheel and the gearwheels of the rotor blades of the timing gear are designed in such a way that the ratio of an angular velocity $\omega_r$ of the reference gearwheel to the angular velocity $\omega_n$ of the rotational movement of the hub is as follows: $\omega_r/\omega_n = 1 \pm (\frac{1}{2})*(S_{rot}/S_r)$, where $S_{rot}$ = size of the gearwheels of the rotor blades, and $S_r$ = size of the reference gearwheel.

In particular in this case, the radius, diameter and/or number of teeth of a gearwheel may be used as parameters for determining the size of the respective gearwheel.

Moreover, in the context of this invention, the term "gearwheel" is to be understood to include not only conventional gearwheels with visibly realized teeth of a very wide variety of shapes and materials, but also so-called "friction gears", i.e. non-sliding gearwheels that are in contact with each other, which may be made of rubber, for example, and can drive each other by frictional engagement.

As a result of the reference gearwheel and the gearwheels of the rotor blades of the timing gear being designed according to the formula given above, it is advantageously possible, unlike in the prior art, to dispense with the provision of directional wheels between the reference wheel and the gearwheels of the rotor blades in the timing gear, and thus to realize a direct operative connection between the reference gearwheel and the gearwheels of the rotor blades, which provides for a more compact design of the hub. Secondly, in contrast to the prior art, the interaction of the timing gear and the hub gear according to the formula given above advantageously makes it possible to dispense with size specifications with regard to the gearwheels used in the timing gear, i.e. the reference gearwheel and the gearwheels of the rotor blades, which not only allows the arrangement of more than three rotor blades on the hub, but also renders the hub design compact, robust and flexible. The number of rotor blades actually arranged on the hub of a universal propeller constructed according to the invention can thus be advantageously adapted to the respective application, in particular in wind power installations, hydropower installations or in an engine of a ship or an aircraft.

Moreover, since the longitudinal axis of each rotor blade when rotating through 360° describes the peripheral surface of a right circular cone, a compactly designed propeller is provided, with each rotor blade being able to alternately make use of both lift components (A) and drag components (W) when rotating along the peripheral surface of a right circular cone.

In a first refinement of the invention, the reference gearwheel may be arranged centrally in the timing gear and surrounded by the gearwheels of the rotor blades. In the case of this "inner configuration", the reference gearwheel and the gearwheels of the rotor blades may then preferably be designed in such a way that the ratio of an angular velocity $\omega_r$ of the reference gearwheel to the angular velocity $\omega_n$ of the rotational movement of the hub is as follows: $\omega_r/\omega_n = 1 + (\frac{1}{2})*(S_{rot}/S_r)$, where $S_{rot}$ = size of the gearwheels of the rotor blades, and $S_r$ = size of the reference gearwheel. The "inner configuration" advantageously provides for the selection of various gearwheel combinations with different sizes of reference gearwheel and the gearwheels of the rotor blades, and allows a multiplicity of rotor blades to be arranged on the hub, and the specific size ratio of reference gearwheel to the gearwheels of the rotor blades to be selected can be determined according to the above-mentioned variant of the formula according to the invention and in dependence on the selected number of rotor blades. In this "inner configuration", the reference gearwheel rotates faster than the hub.

Alternatively, in a refinement of the invention, the reference gearwheel, preferably realized as a planetary wheel, a ring gear or a crown wheel, may be arranged outside the center of the timing gear and in turn surround the gearwheels of the rotor blades. In the case of this "outer configuration", the reference gearwheel and the gearwheels of the rotor blades may preferably be designed in such a way that the ratio of an angular velocity $\omega_r$ of the reference gearwheel to the angular velocity $\omega_n$ of the rotational movement of the hub is as follows: $\omega_r/\omega_n = 1 - (\frac{1}{2})*(S_{rot}/S_r)$, where $S_{rot}$ = size of the gearwheels of the rotor blades, and $S_r$ = size of the reference gearwheel. This "outer configuration" is just as flexible as the "inner configuration" with regard to the number of rotor blades and the possible gearwheel combinations, but in addition results in less wear, or less attrition, of the gearwheels. According to the above-mentioned variant of the formula according to the invention, the reference gearwheel in the "outer configuration" rotates more slowly than the hub.

In a further refinement of the invention, the longitudinal axis of each rotor blade may be arranged at an angle α of between 30° and 60°, or between 35° and 55°, or between 40° and 50° with respect to the central axis of the shaft. According to the invention, an arrangement at 45° that advantageously makes maximum use of both lift components (A) and drag components (W), has proved to be preferable.

In this regard it has proved useful if, when the hub rotates about the shaft, at a first transit point (T1) each rotor blade is in alignment with a perpendicular plane (x, z) of a three-dimensional coordinate system (x, y, z) relating to the universal propeller. The alignment of the rotor blades with a perpendicular plane, which is preferably perpendicular to an air flow or water flow, advantageously makes use of drag components (W) at their (theoretical) maximum.

In this case, at the first transit point (T1), the longitudinal axis of each rotor blade may have a vertical deviation of up to +/−15° within the perpendicular plane (x, z).

In addition, it has proved useful if, when the hub rotates about the shaft, at a third transit point (T3) each rotor blade is in alignment with a horizontal plane (x, y) of a three-dimensional coordinate system (x, y, z) relating to the universal propeller. The alignment of the rotor blades with a horizontal plane, which is preferably parallel to an air flow or water flow, advantageously makes use of lift components (A) at their (theoretical) maximum.

In this case, at the third transit point (T3), the longitudinal axis of each rotor blade may have a horizontal deviation of up to +/−15° outside the horizontal plane (x, y).

In a further preferred refinement of the invention, it has proved useful if each rotor blade, at least portionally, has two substantially flat upper sides.

Substantially flat upper sides advantageously allow solar cells to be arranged on them for additional generation of electric power from solar energy.

In a further preferred refinement of the invention, it has proved useful if the lateral edges of each rotor blade are rounded or conical. Rounded or conical lateral edges have the advantage of reduced, or minimized, drag coefficients.

In order to avoid a reduction in performance due to vibrations of the rotor blades, it has proved useful if mutually adjacent and/or mutually opposite rotor blades are connected to each other by means of cables. The cables in this case may be attached to the rotor blades between a central and an end position, preferably in the region of or adjacent to their rotor blade tips. Such cables advantageously impart additional stability, support and strength to the rotor blades.

The present invention is suitable, in particular, for mounting arrangements in which the central axis of the shaft is arranged at an angle ß of between 0° and 360°, preferably of 45°, with respect to a horizontal (X) of a mounting coordinate system (X, Y, Z) relating to the universal propeller. Arrangement at an angle ß=45° advantageously enables universal propellers according to the invention to be mounted on a hilltop, on a pitched or flat roof, or even on a building wall or a comparable vertical plane. Even in the case of conventional mast mounting arrangements, however, arrangement of the central axis of the shaft at an angle ß=45° advantageously enables universal propellers according to the invention to be mounted away from the mast, thereby advantageously avoiding damage to or breakages of rotor blades on the mast, as occurs regularly, in particular, in the case of known HAWT installations during strong wind gusts or storm gusts.

The present invention additionally relates to a method for operating a universal propeller as previously described, in which, by means of a gear mechanism, a rotation of the rotor blades about their longitudinal axis is effected in synchronism with the rotation of the rotor blades through 360° along the peripheral surface of a circular cone.

In a refinement of the method, it has proved useful if the rotational speed of the rotor blades about their longitudinal axis is half that of the rotational speed of the rotor blades through 360° along the peripheral surface of the circular cone. Thus, the rotational speed of the rotor blades along the peripheral surface of the circular cone is synchronous with the rotational speed of the hub, or of the universal propeller as a whole. In contrast, the rotor blades rotate about their longitudinal axis preferably contrary to the direction of rotation of the rotor blades through 360° along the peripheral surface of the circular cone. This has the advantage that the rotor blades, when rotating through 360° along the peripheral surface of the circular cone, are constantly aligned to make use of maximum lift components (A) or drag components (W).

The present invention is suitable, in particular, for favored uses such as use in a wind power installation, hydropower installation or an engine of a ship or an aircraft.

Additional details and further advantages of the invention are described in the following on the basis of preferred exemplary embodiments, to which, however, the present invention is not limited, and in conjunction with the accompanying drawing.

DETAILED DESCRIPTION OF THE INVENTION

In the following description of preferred embodiments of the present invention, components that are the same or comparable are denoted by the same references.

Figure 1:
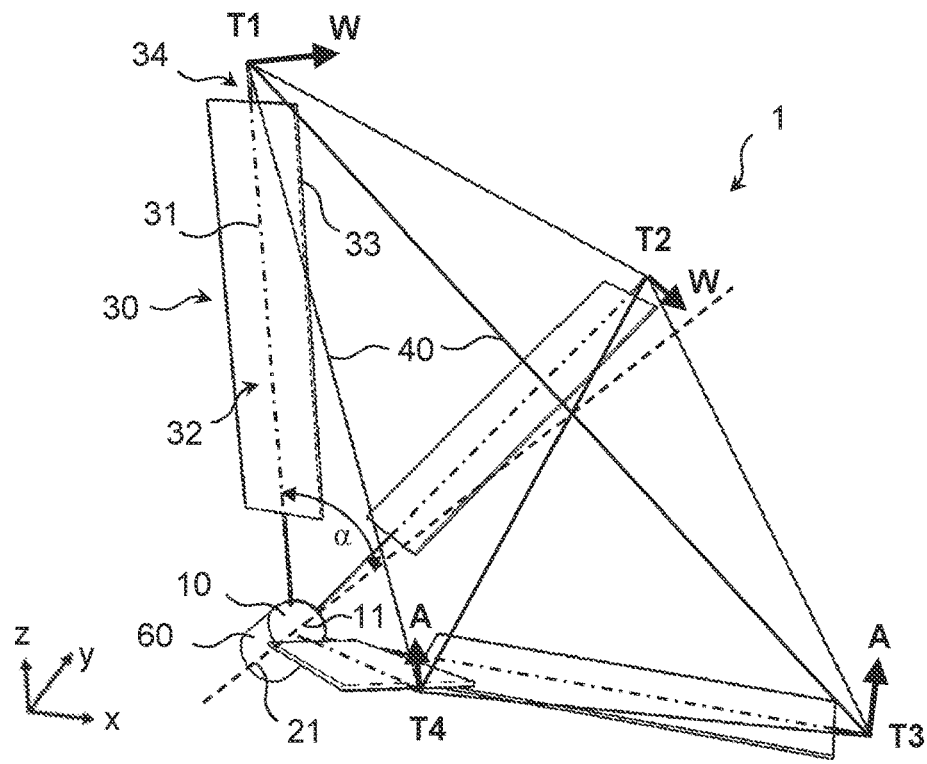
FIG. 1 shows a universal propeller in a perspective view.

FIG. 1 shows a universal propeller 1 in a perspective view. The universal propeller 1 represented comprises a hub 10 that is rotatably mounted on a shaft 20. On the hub 10, there are either two rotor blades 30 arranged opposite one other or at least three rotor blades 30 arranged in a star configuration with respect to one another. A particularly preferred exemplary embodiment is represented, having four rotor blades 30 arranged in a star configuration, wherein, according to the invention, on the hub 10 each rotor blade 30 is arranged, at the end of its longitudinal axis 31, at an angle α with respect to the central axis 21 of the shaft 20 in such a way that the longitudinal axis 31 of each rotor blade 30 when rotating through 360° describes the peripheral surface 71 of a right circular cone 70.

Figure 2:
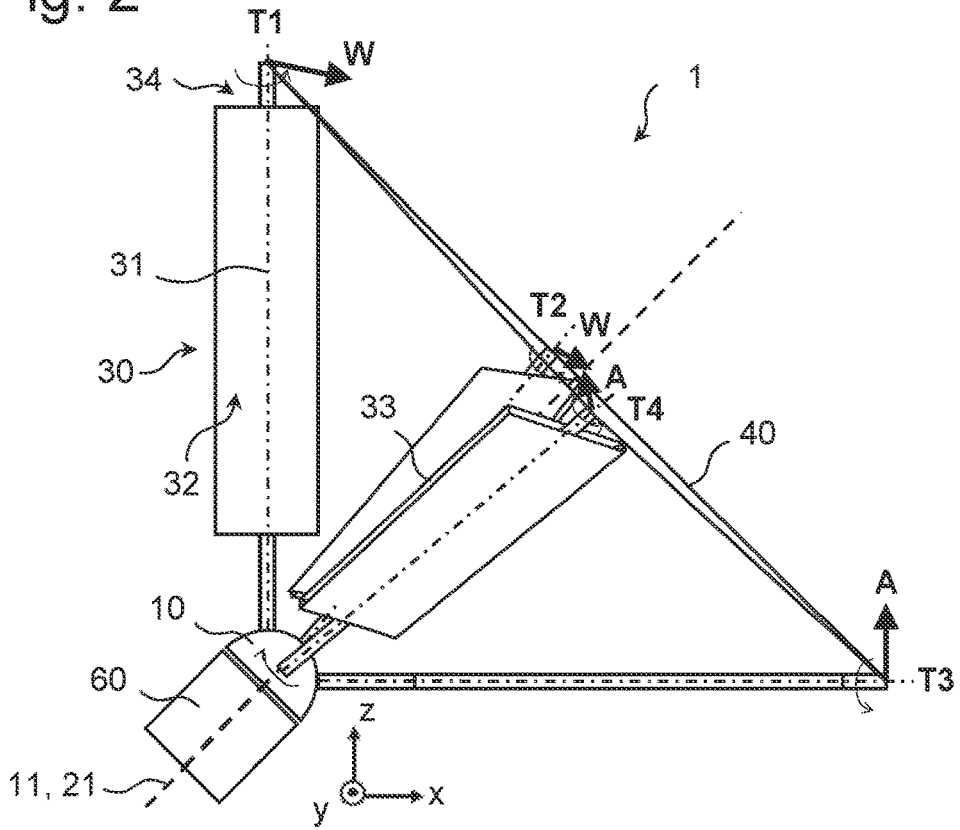
FIG. 2 shows the universal propeller from FIG. 1 in a side view.

FIG. 2 shows the universal propeller 1 from FIG. 1, in a side view. It can be see how, owing to the fact that the longitudinal axis 31 of each rotor blade 30 when rotating through 360° describes the peripheral surface 71 of a right circular cone 70, a compactly designed propeller 1 is provided, with each rotor blade being 30 able to alternately make use of both lift components A and drag components W (indicated by arrows in bold) when rotating along the peripheral surface of a right circular cone.

In a refinement of the invention, the longitudinal axis 31 of each rotor blade 30 may be arranged at an angle α of between 30° and 60°, or between 35° and 55°, or between 40° and 50° with respect to the central axis 21 of the shaft 20. According to the invention, an arrangement at 45°—as represented—that advantageously makes maximum use of both lift components A and drag components W has proved to be preferable.

In this regard it has proved useful if, when the hub 10 rotates about the shaft 20, at a first transit point T1 each rotor blade 30 is in alignment with a perpendicular plane (x, z) of a three-dimensional coordinate system (x, y, z) relating to the universal propeller 1. The alignment of the rotor blades 30 with a perpendicular plane, which is preferably perpendicular to an air flow or water flow, advantageously makes use of drag components W at their (theoretical) maximum.

In this case, at the first transit point T1, the longitudinal axis 31 of each rotor blade 30 may have a vertical deviation of up to +/−15° within the perpendicular plane (x, z) (not represented).

In addition, it has proved useful if, when the hub 10 rotates about the shaft 20, at a third transit point T3 each rotor blade 30 is in alignment with a horizontal plane (x, y) of a three-dimensional coordinate system (x, y, z) relating to the universal propeller 1. The alignment of the rotor blades 30 with a horizontal plane, which is preferably parallel to an air flow or water flow, advantageously makes use of lift components A at their (theoretical) maximum.

In this case, at the third transit point T3, the longitudinal axis 31 of each rotor blade 30 may have a horizontal deviation of up to +/−15° outside the horizontal plane (x, y) (not represented).

In order to avoid a reduction in performance due to vibrations of the rotor blades 30, it has proved useful if mutually adjacent and/or mutually opposite rotor blades 30 are connected to each other by means of cables 40. The cables 40 in this case may be attached to the rotor blades 30 between a central and an end position, preferably in the region of or adjacent to their rotor blade tips 34. Such cables 40 advantageously impart additional stability, support and strength to the rotor blades 30.

Figure 3:
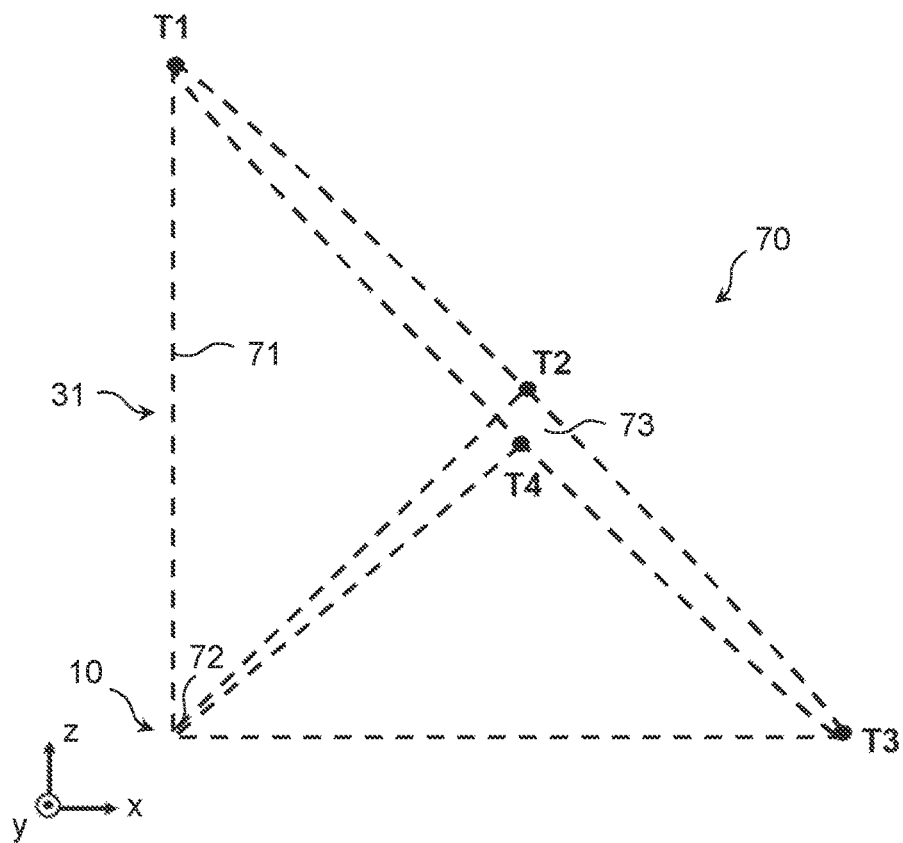
FIG. 3 shows a circular cone, resulting from rotation of each rotor blade, with four transit points T1, T2, T3 and T4, selected as examples.

FIG. 3 shows a circular cone 70, resulting from the rotation of each rotor blade 30, with four transit points T1, T2, T3 and T4, selected as examples. As is generally known, a cone is a geometric body formed when all points of a limited and continuous piece of surface lying in a plane are connected in a straight line to a vertex 72 outside the plane. If the piece of surface is a circular disk 73—as is the case here—the body is called a circular cone 70. If the vertex 72 is perpendicular to the circular disk 73—as is the case here—the body is called a right circular cone 70. In the case of the universal propeller 1 according to the invention, the vertex is formed by the hub 10.

This refinement of a universal propeller 1 has the advantage that, when the rotor blades 30 pass through the selected transit points T1 to T4, they have (not only but at least theoretically) the following drag W and lift A values:

|  | T1 | T2 | T3 | T4 |
| --- | --- | --- | --- | --- |
| Drag components (W) | Max. | Mean | Min. | Mean |
| Lift components (A) | Min. | Mean | Max. | Mean |

Figure 4:
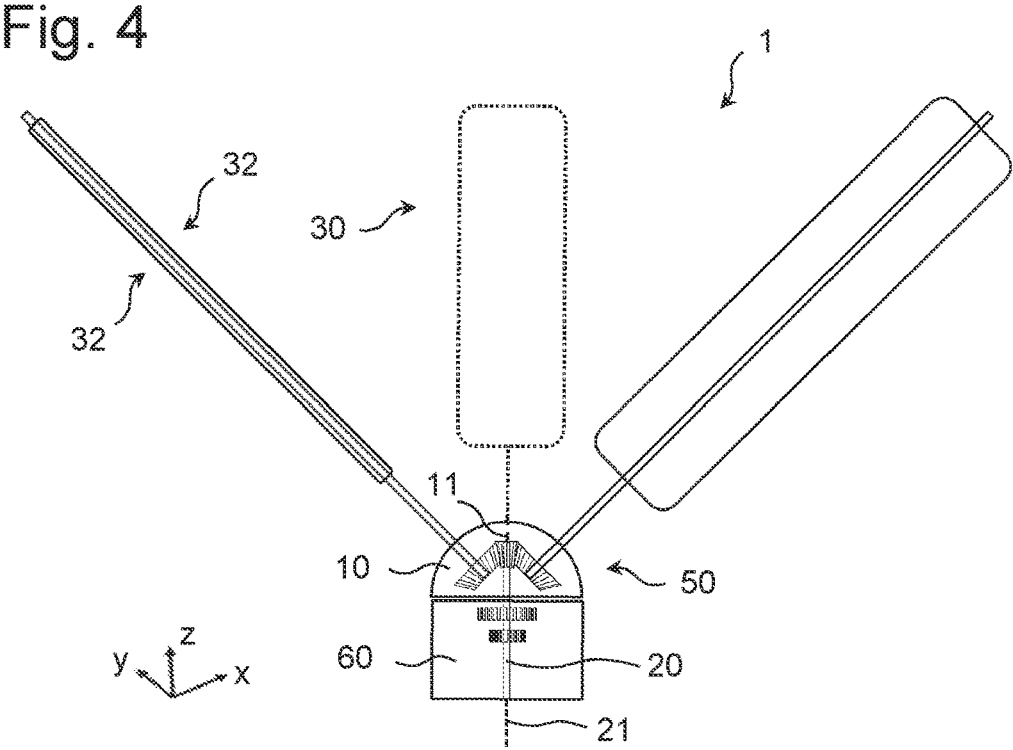
FIG. 4 shows a universal propeller in a side view, with rounded rotor blade tips.

FIG. 4 shows a side view of a universal propeller 1 with rounded rotor blade tips 34. It has proved useful if each rotor blade 30, at least portionally, has two substantially flat upper sides 32. Substantially flat upper sides 32 advantageously allow solar cells to be arranged on them for additional generation of electric power from solar energy (not represented). Also provided is a timing gear 50 (not represented here in a functionally accurate manner or in true scale) enabling the rotor blades 30 to be rotated about their longitudinal axis 31. More detailed explanations of the timing gear 50 according to the invention, based on two refinement examples, can be found in the description of FIGS. 19 to 21.

Figure 8:
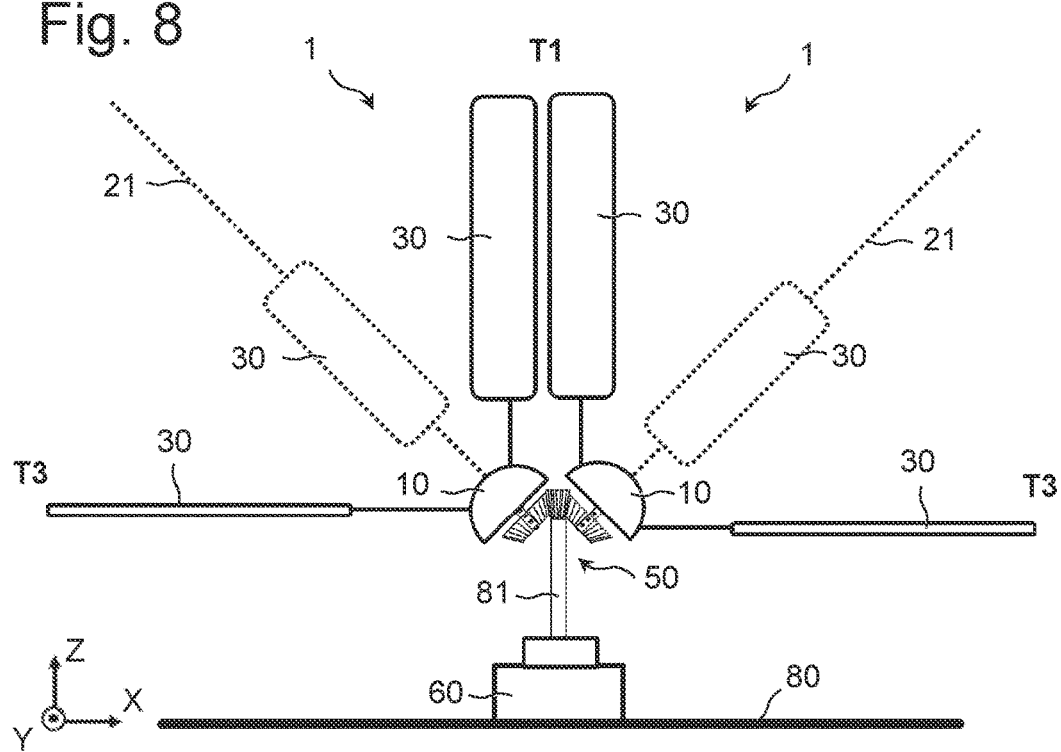

A method for operating a universal propeller 1 as previously described is characterized by the fact that, by means of a timing gear 50 (not represented in a functionally accurate manner or in true scale in FIG. 4 and FIG. 8), a rotation of the rotor blades 30 about their longitudinal axis 31 is effected in synchronism with the rotation of the rotor blades 30 through 360° along the peripheral surface 71 of a circular cone 70.

In a refinement of the method, it has proved useful if the rotational speed of the rotor blades 30 about their longitudinal axis 31 is half that of the rotational speed of the rotor blades through 360° along the peripheral surface 71 of the circular cone 70. Thus, the rotational speed of the rotor blades 30 along the peripheral surface 71 of the circular cone 70 is synchronous with the rotational speed of the hub 10, or of the universal propeller 1 as a whole. In contrast, the rotor blades 30 rotate about their longitudinal axis 31 preferably contrary to the direction of rotation of the rotor blades 30 through 360° along the peripheral surface 71 of the circular cone 70 (the direction of rotation of the rotor blades 30 and the direction of rotation of the hub 10 are indicated by corresponding arrows in FIG. 2). This has the advantage that the rotor blades 30, when rotating through 360° along the peripheral surface 71 of the circular cone 70, are constantly aligned to make use of maximum lift components A or drag components W.

Figure 5:
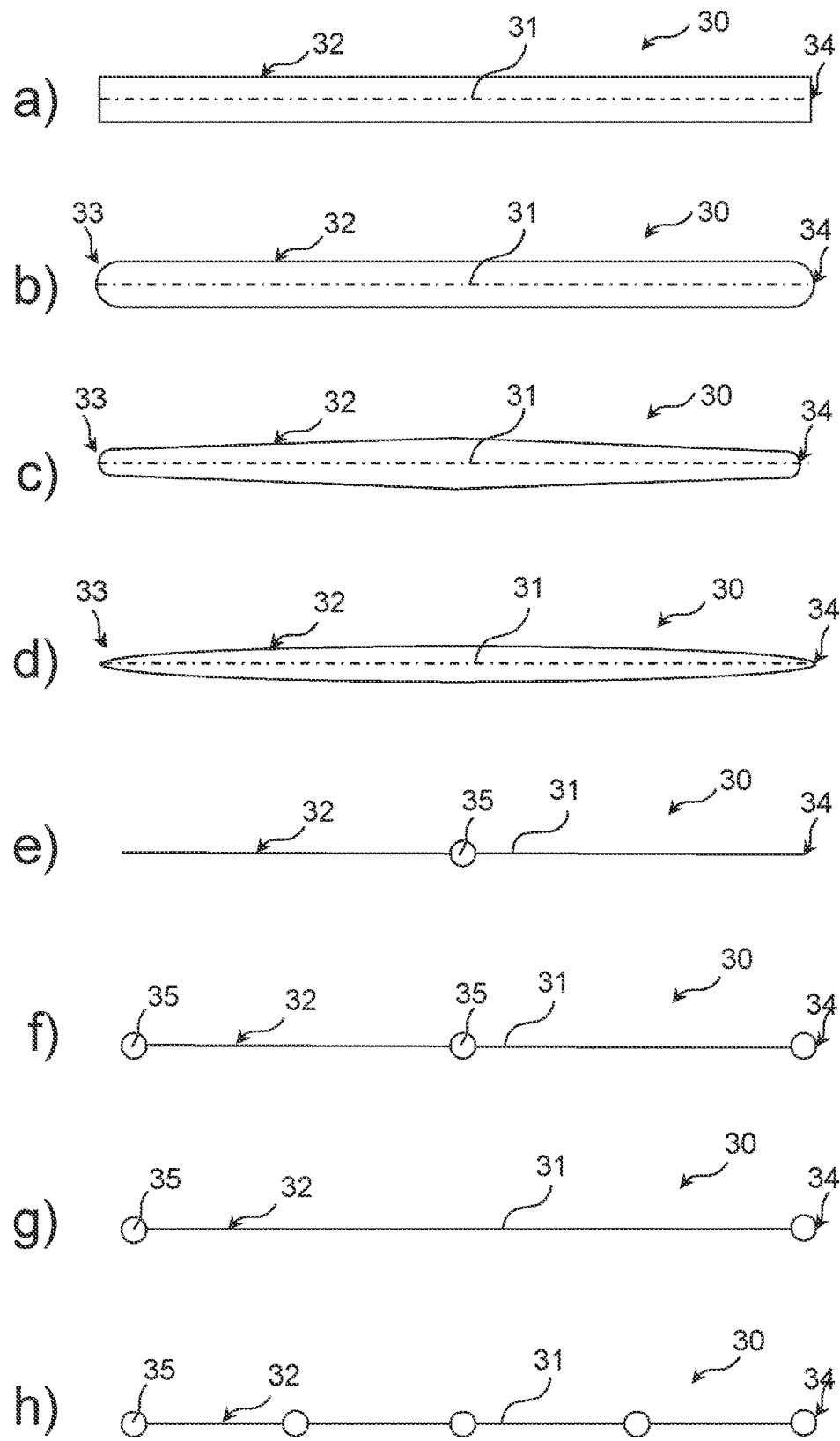
FIG. 5 shows an overview of conceivable rotor blade profiles.

FIG. 5 shows an overview of preferred rotor blade profiles. Here, FIG. 5a shows a substantially rectangular rotor blade 30. The rotor blade represented in FIG. 5b differs from it in having rounded lateral edges 33. In contrast, FIG. 5c shows a substantially diamond-shaped rotor blade 30 with likewise rounded lateral edges 33. Finally, FIG. 5d shows a substantially oval-profiled rotor blade 30 with conically shaped lateral edges 33. Rounded or conically shaped lateral edges 33 have the advantage of reduced, or minimized, drag coefficients. In addition, ultra-flat rotor blades 30 may also be used. FIG. 5e to FIG. 5h show various embodiments, in which stiffeners 35 may be provided in the center and/or at the end of the rotor blade 30 for stability. The rotor blades 30 represented in FIG. 5a to FIG. 5h may be made of known composite fiber materials. Alternatively, in particular in the case of the rotor blades 30 represented in FIGS. 5e to 5h, textile materials that are tensioned by the stiffeners 35 are also suitable.

Figure 15:
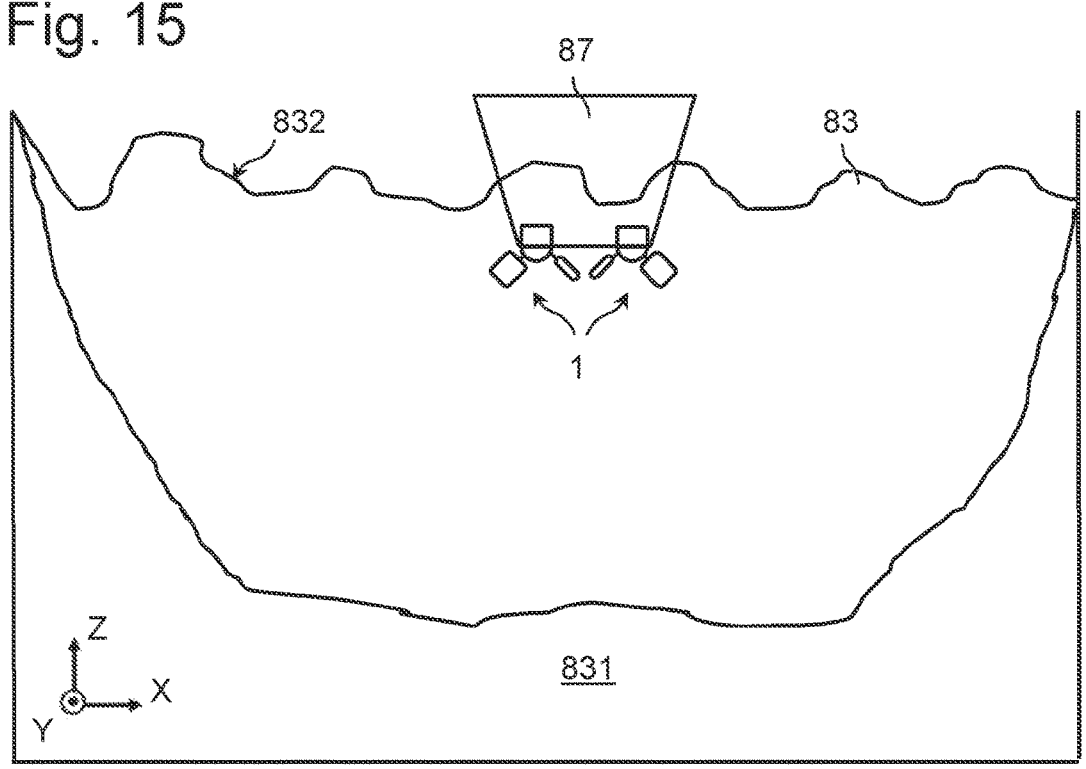
Figure 16:
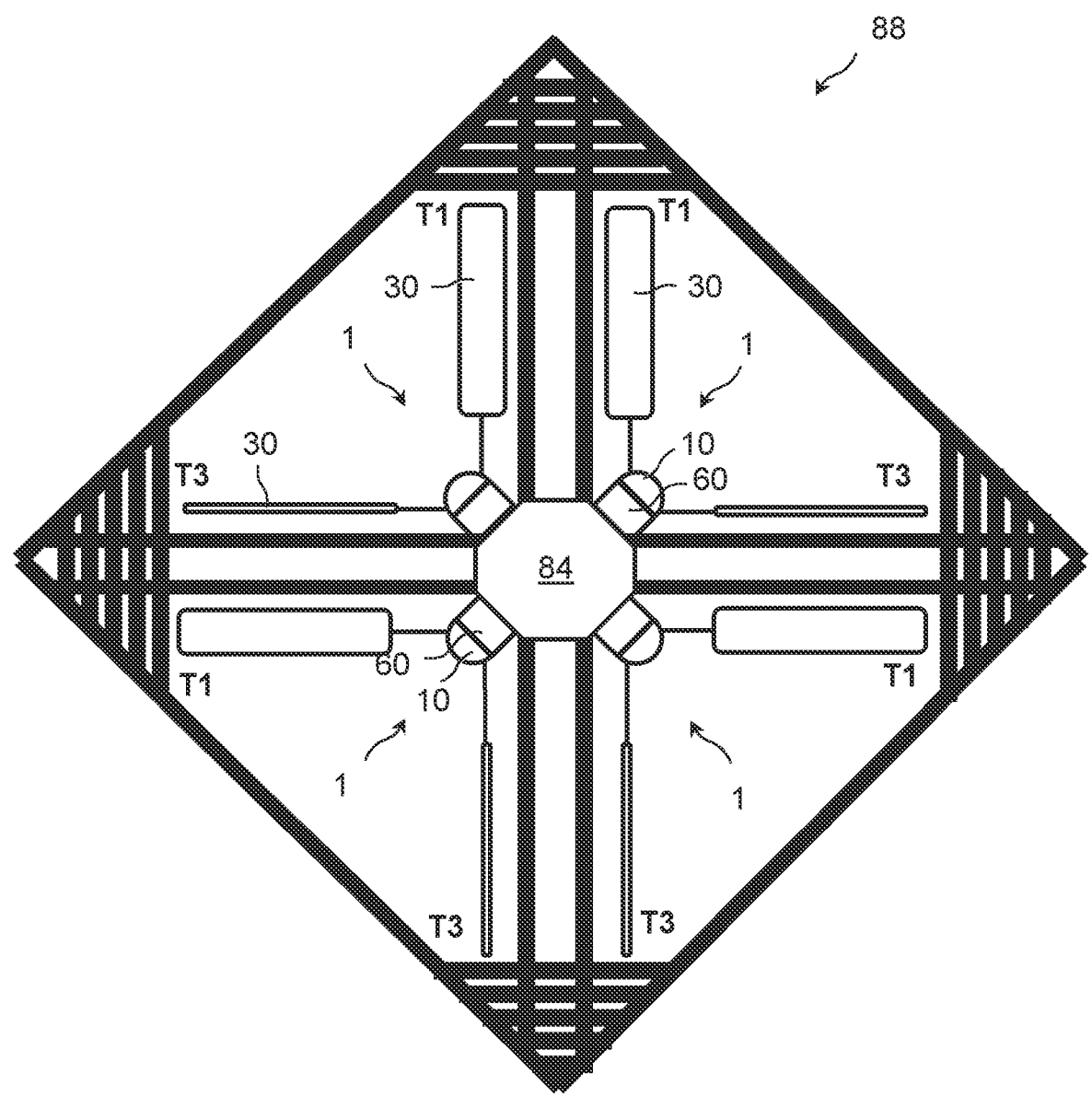
Figure 17:
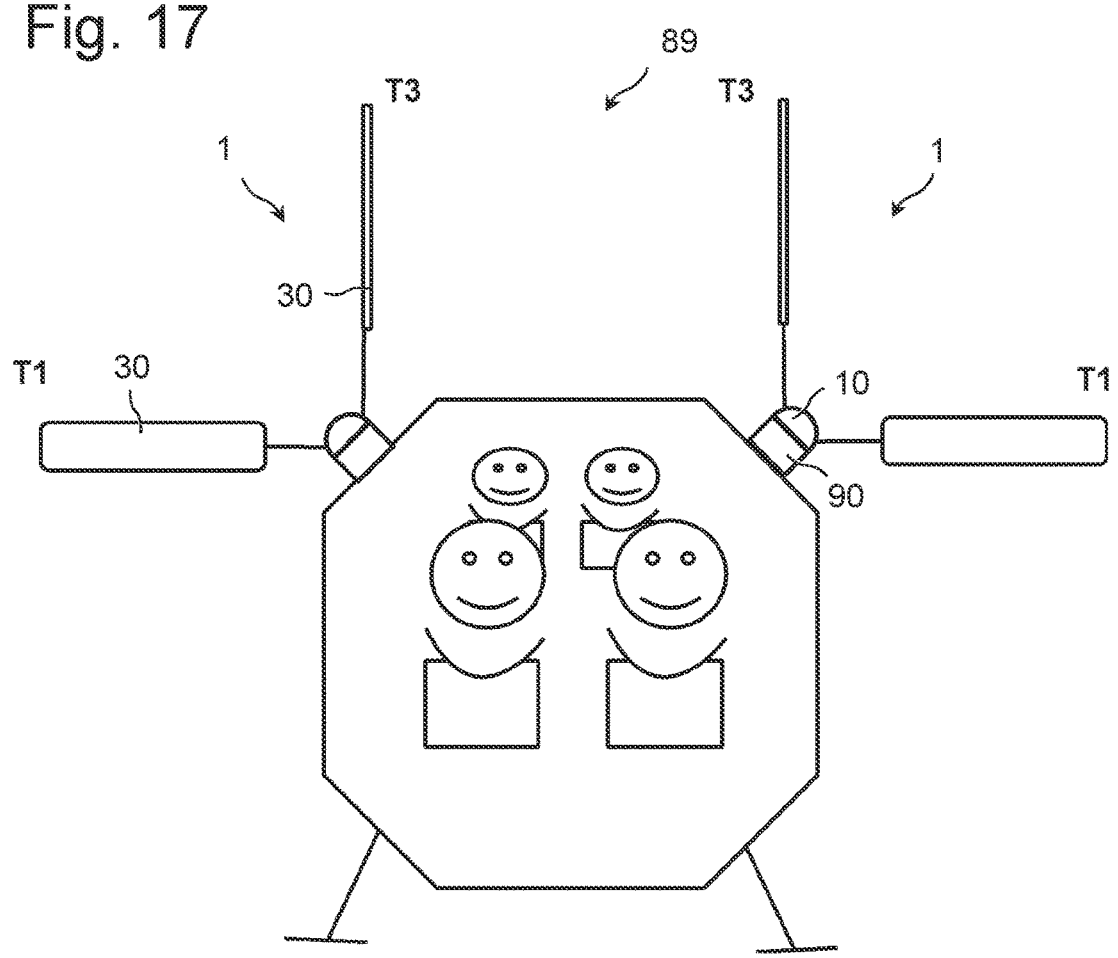
Figure 18:
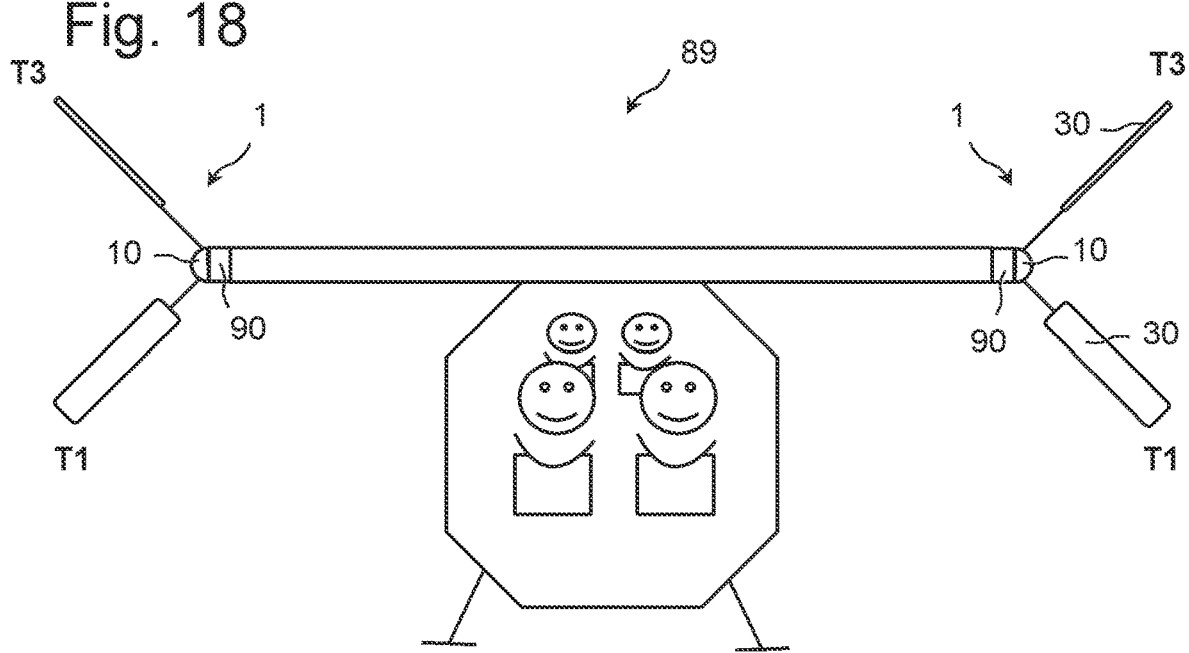

The present invention is suitable, in particular, for favored uses such as use in a wind power installation (FIGS. 6 to 9), hydropower installation (FIGS. 10 to 14) or an engine of a ship (FIG. 15) or an aircraft (FIGS. 16 to 18). Suitable mounting arrangements in this case are those in which the central axis 21 of the shaft 20 is arranged at an angle of between 0° and 360°, preferably of 45°, with respect to a horizontal.

Figure 6:
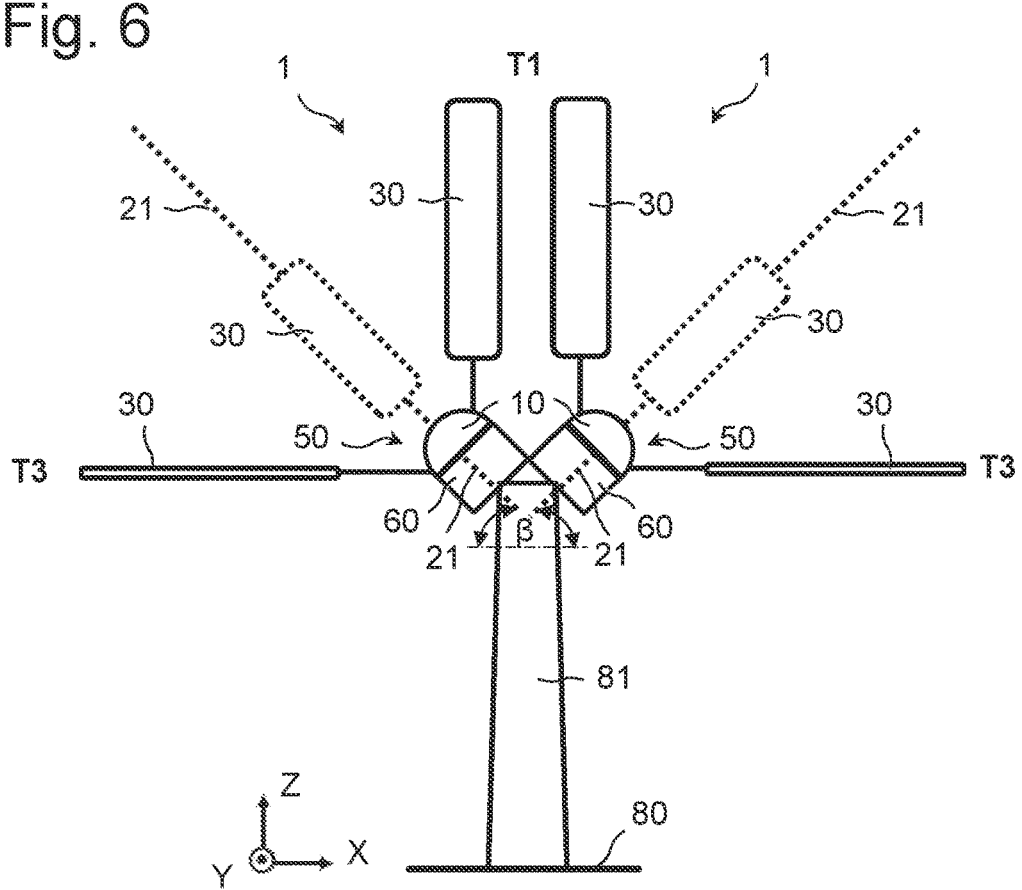
FIGS. 6 to 18 show various mounting situations and specific applications of a universal propeller according to the invention.

FIG. 6 shows a preferred mounting arrangement of two universal propellers 1 as part of a tandem wind power installation. A mast 81 can be seen, which rises from the ground 80 along a vertical Z of a mounting coordinate system (X, Y, Z) relating to the universal propeller 1. Said mast 81 carries two generators 60 for generating electric power, which are each driven by the hub 10 of a universal propeller 1 according to the invention. In this case the central axis 21 of the shaft 20 (not represented) is arranged away from the mast 81 at the preferred angle ß=45° with respect to the horizontal X. One or more timing gears 50 (not represented in a functionally accurate manner or in true scale in FIG. 4 and FIG. 8) may be provided, for example in the hub 10 itself (cf. FIG. 4) or between the hub 10 and the generator 60, for the purpose of synchronizing the rotation of the rotor blades 30 about their longitudinal axis 31, the rotation of the rotor blades 30 through 360° along the peripheral surface 71 of a circular cone 70 and/or the drive of the generator 60.

Figure 7:
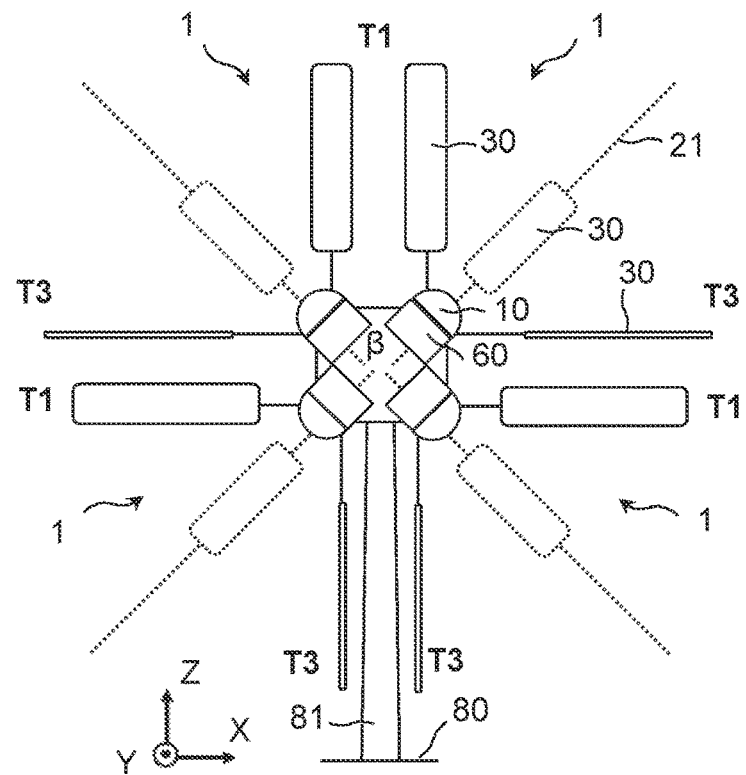

FIG. 7 shows a preferred mounting arrangement of four universal propellers 1 as part of a quattro wind power installation. It is evident that the universal propellers 1 are grouped in a star configuration in such a way that forces acting upon the mast 81 as a result of lift A and drag components W are balanced-out as far as possible. Further details are as described in FIG. 6.

FIG. 8 shows a preferred mounting arrangement of two universal propellers 1 as part of a tandem wind power installation, in which a common generator 60, which is not arranged on the mast 81 but on the ground 80, is driven via a timing gear 50 (not represented here in a functionally accurate manner or in true scale).

Figure 9:
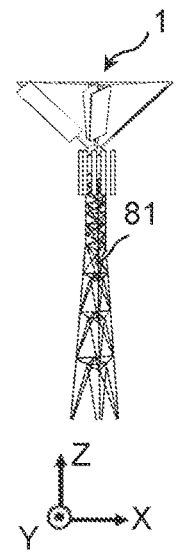

Of course, a single universal propeller 1 according to the invention may also be arranged on the end of a mast 81, in particular on the end of a mobile telephone mast (FIG. 9). In this case, the central axis 21 of the shaft 20 (not represented) is arranged at a preferred angle $\beta=90°$ with respect to the horizontal X, at the end of the mast 81.

Figure 9A:
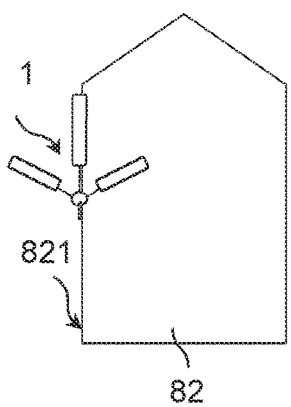
Figure 9B:
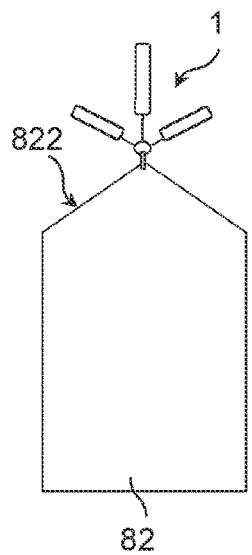
Figure 9C:
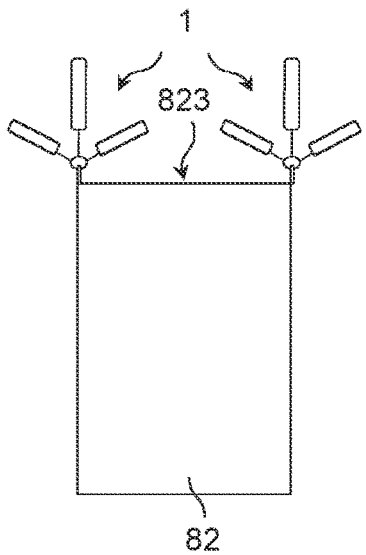

FIGS. 9a to 9c show further preferred mounting arrangements of individual universal propellers 1 on various buildings 82.

As can be seen in FIG. 9a, a universal propeller 1 according to the invention may be arranged laterally on the facade 821 of a building 82. In this case, the central axis 21 of the shaft 20 (not represented) is arranged away from the facade 821 of the building 82, at a preferred angle $\beta=45°$ with respect to the horizontal X.

Alternatively or additionally, a universal propeller 1 according to the invention may also be part of a wind power installation arranged on a pitched roof 822 (FIG. 9b) or flat roof 823 (FIG. 9c) of a building 82. In this case, the central axis 21 of the shaft 20 (not represented) is arranged at a preferred angle $\beta$ of between 45° and 90° with respect to the horizontal X, on the roof 822 or 823, respectively, of the building 82.

Figure 10:
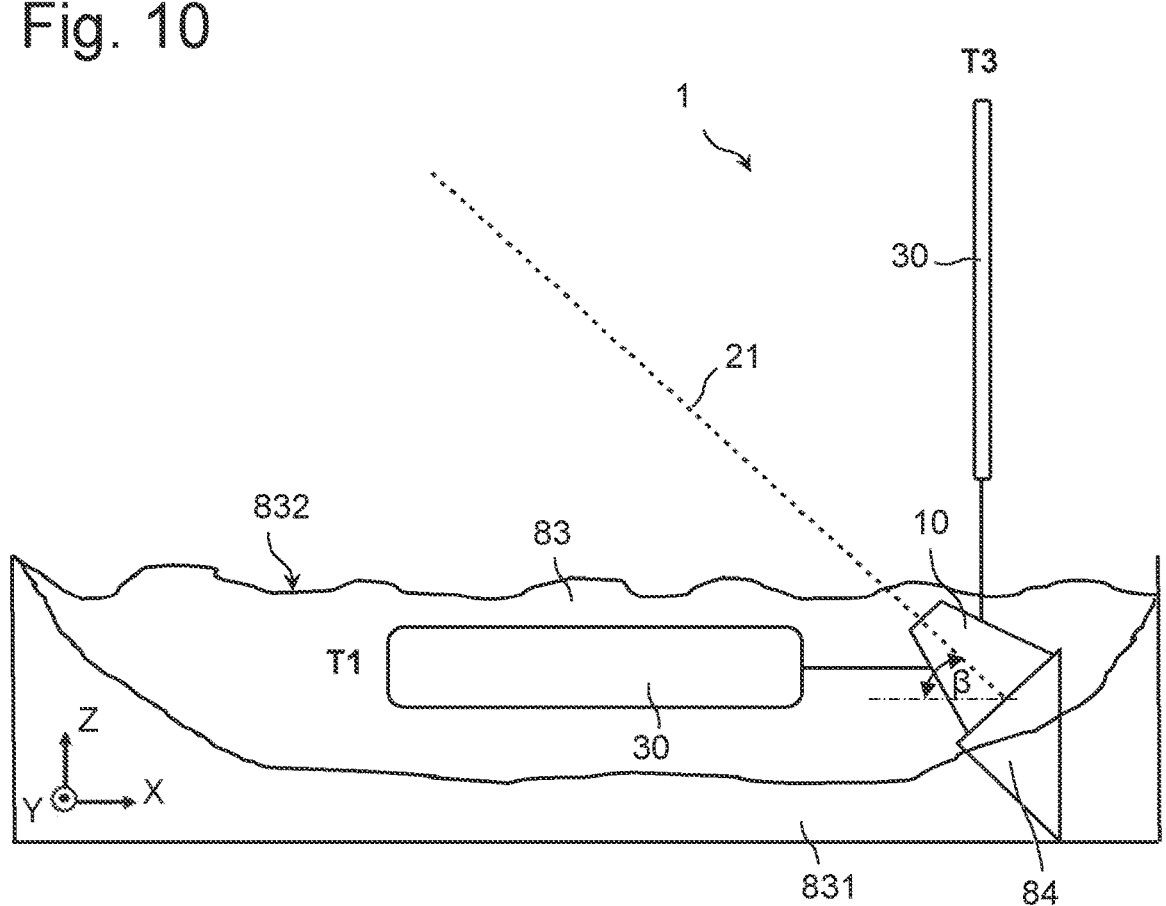

FIG. 10 shows a preferred mounting arrangement of a universal propeller 1 as part of a hydropower installation. It can be seen how a universal propeller 1 according to the invention may be arranged on a bearing 84 anchored in the bed 831 of a body of water 83. The arrangement may preferably be configured in such a way that, in the case of the represented transit point T1, the rotor blade 30 with the highest drag component W with respect to the water flow is completely immersed in the body of water 83, while the remaining rotor blades 30 rotate at least partially, or preferably entirely, outside the water level 832. The body of water 83 may be a river, a strait or other flowing body of water, for example the outlet of a dam or the penstock of a hydroelectric power plant.

Figure 11:
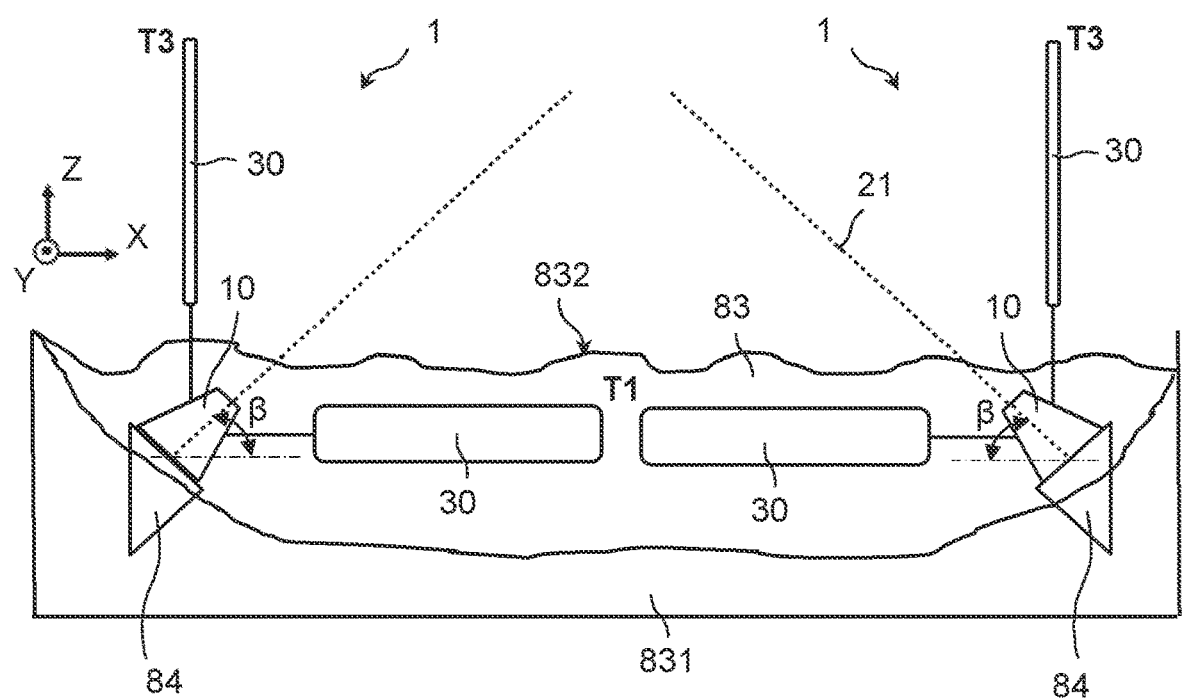

FIG. 11 shows a preferred mounting arrangement of two universal propellers 1 as part of a tandem hydropower installation, with a separate bearing 84 for each universal propeller 1. Further details are as described in FIG. 10.

Figure 12:
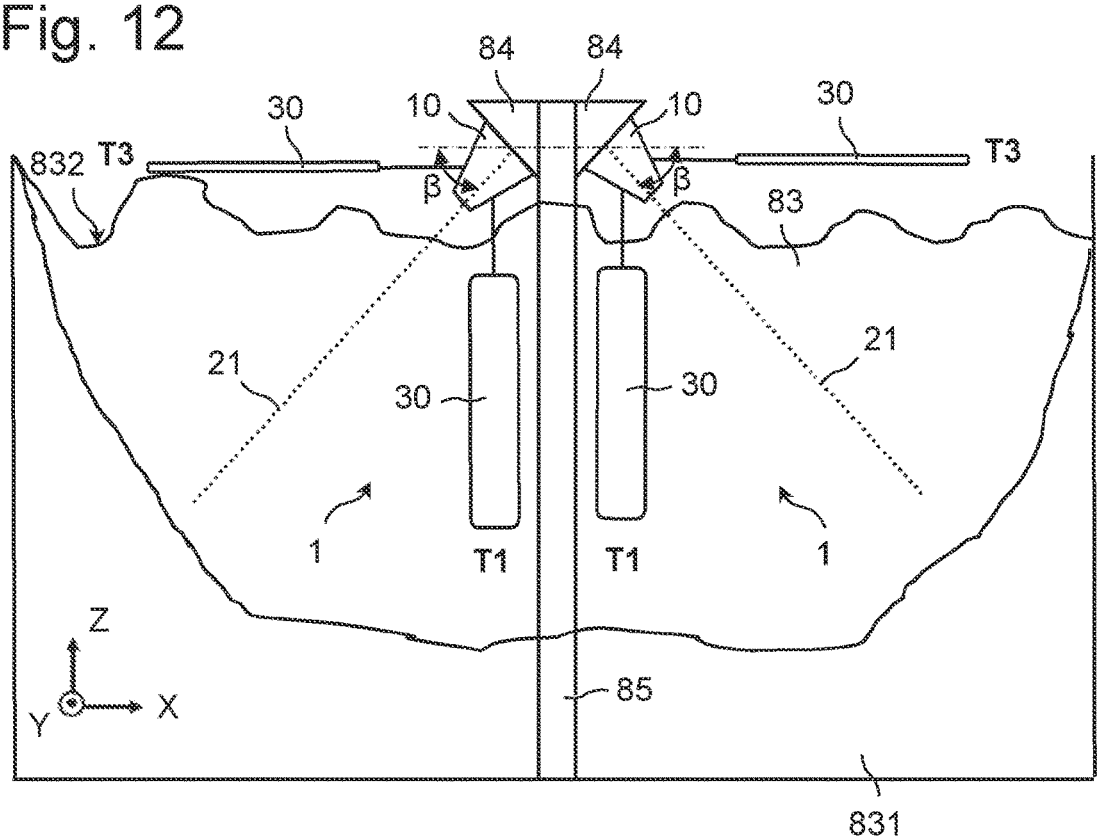

FIG. 12 shows a preferred mounting arrangement of two universal propellers 1 as part of a tandem hydropower installation, with a common bearing mast 85 anchored in the water bed 831. Further details are again as described in FIG. 10.

Figure 13:
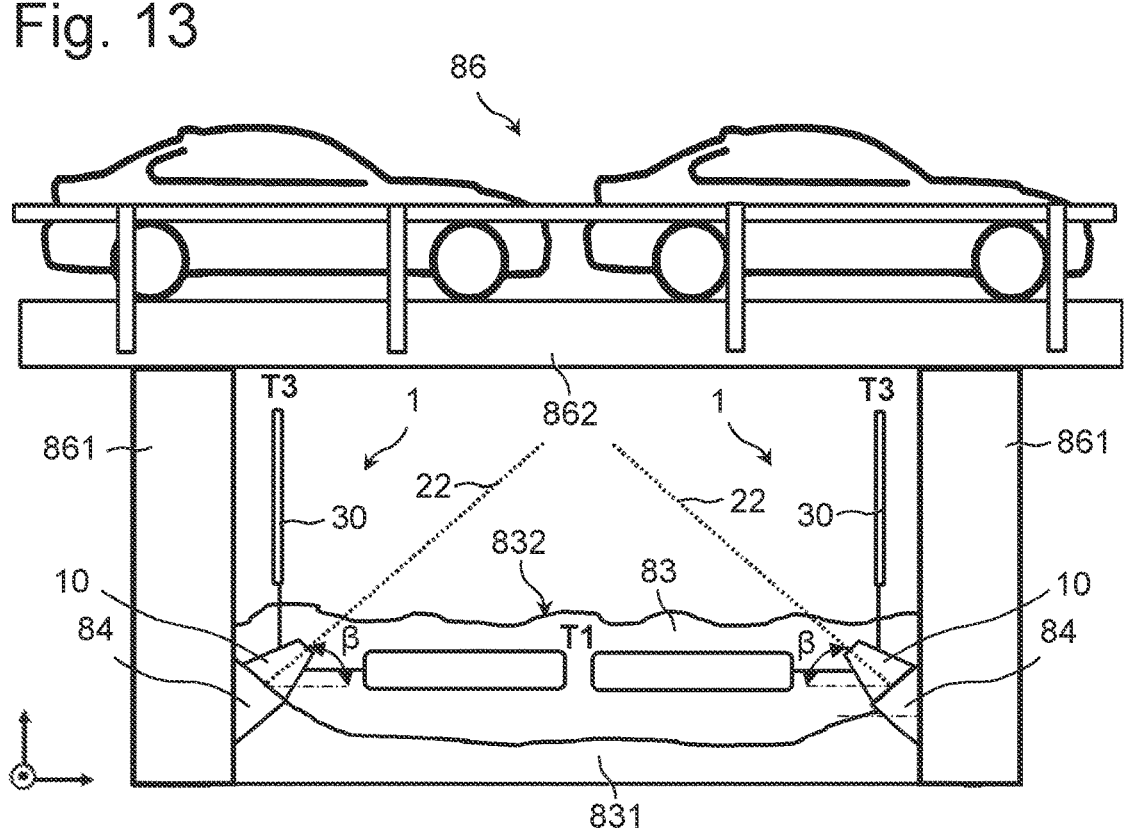

FIG. 13 shows how the tandem hydropower installation from FIG. 11 may preferably be arranged under a bridge 86, and the bearings 84 may be part of the bridge piers 861. Further details are again as described in FIG. 10.

Figure 14:
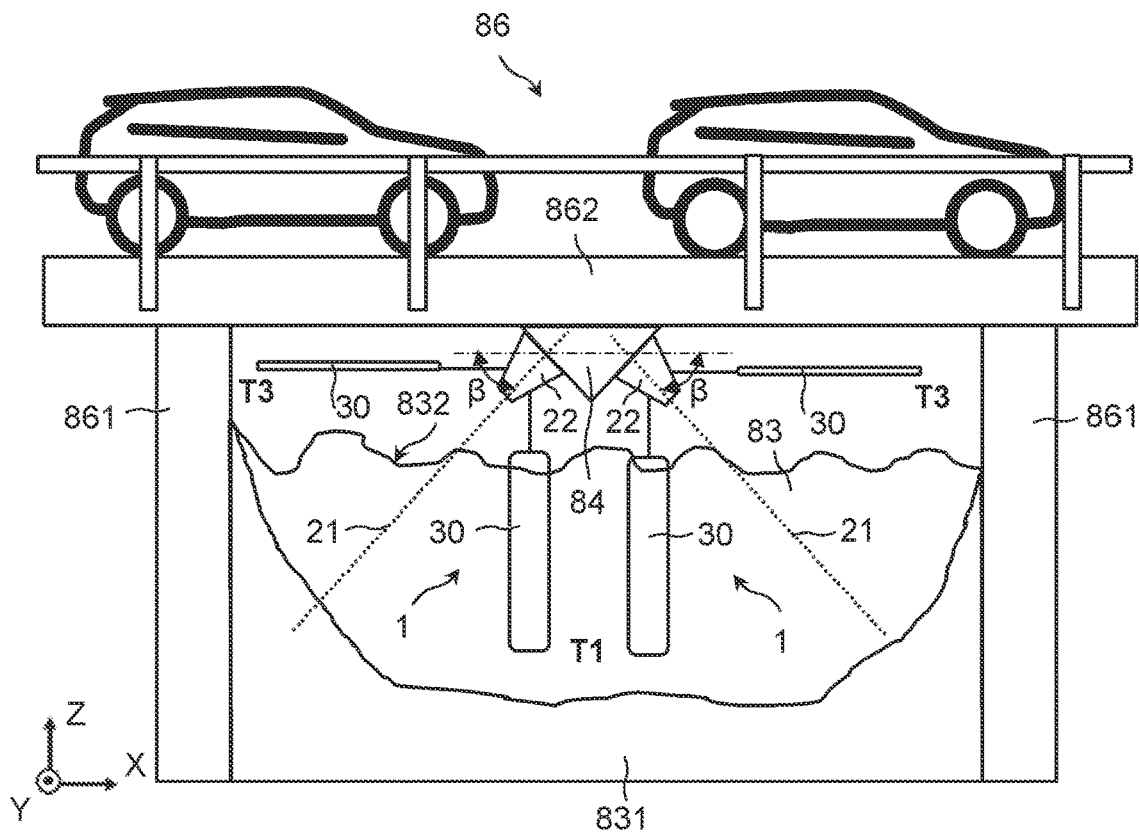

FIG. 14 shows an alternative tandem hydropower installation with a bearing 84 arranged below the bridge element 862. Further details are as described in FIG. 10.

FIG. 15 shows the preferred use of two universal propellers 1 as engines of a ship 87. Unlike in applications for electric power generation, the shaft 20 of each universal propeller 1 is now driven by a motor 90 (not represented here) or comparable drive. It is understood that the drive causes the universal propellers 1 to rotate in such a way that all forces acting upon the ship 87 through the universal propellers 1 are balanced-out when the ship is travelling straight ahead.

FIG. 16 shows the preferred use of four universal propellers 1 as part of an energy kite 88. As in the exemplary embodiment according to FIG. 7, here also the universal propellers 1 are grouped in a star configuration in such a way that forces acting upon the energy kite 88 as a result of lift components A and drag components W are balanced-out as far as possible. It can be seen how the hub 10 of each universal propeller 1 drives a respective generator 60, these being grouped in a star configuration around a central bearing 84 in such a way that the forces of the universal propellers 1 are balanced-out. In other respects, reference may be made analogously to the explanations given above.

FIGS. 17 and 18 show the preferred use of two universal propellers 1 as the engine of an aircraft 89 (transport drone). In contrast to applications for electric power generation, the shaft 20 of each universal propeller 1 is now driven by a motor 90 or comparable drive. It is understood that the drive causes the universal propellers 1 to rotate in such a way that all forces acting upon the aircraft 89 through the universal propellers 1 are balanced-out when the aircraft is flying straight ahead. Advantageously in this case, no extra wings are required for the aircraft 89 represented in FIG. 17. Rather, the universal propellers 1 may be arranged directly on the outer housing of the aircraft, which has the advantage of making the aircraft extremely maneuverable. Optionally—as in the case of the aircraft 89 shown in FIG. 18—short stub wings may be provided for interfacing the universal propellers 1 to the outer housing of the aircraft 89, which advantageously increases the flight stability of the aircraft 89.

In the following FIGS. 19-21, the principle of operation of the universal propeller 1 according to the invention, in particular the interaction of the timing gear 50 and hub gear 12, is illustrated on the basis of various refinements and configuration examples.

Figure 19:
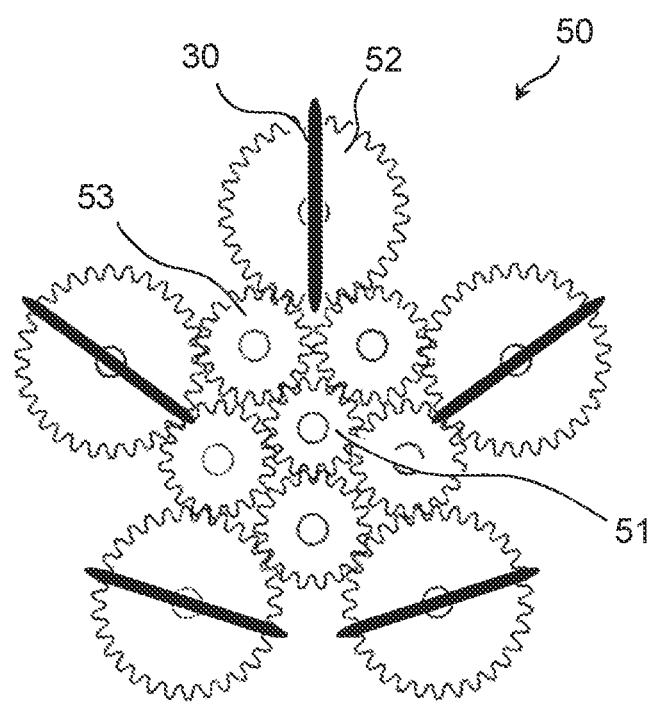
FIG. 19 shows an example of a timing gear from the prior art.

For this purpose, FIG. 19 shows an example of a timing gear 50 from the prior art.

The example represented here shows a timing gear 50 for controlling five rotor blades 30. For this purpose, in addition to the reference gearwheel 51 and the five gearwheels 52 of the rotor blades 30, five further directional wheels 53, positioned between the reference gearwheel 51 and the gearwheels 52, must be provided, which in particular serve to transmit power and adjust the direction of rotation of the gearwheels 52 of the rotor blades 30. There is also a necessary size relationship of $S_{rot}/S_r=2/1$ to be maintained between the reference gearwheel 51 and the gearwheels 52 of the rotor blades 30, where $S_{rot}$=size of the gearwheels 52 of the rotor blades 30 and $S_r$=size of the reference gearwheel 51, so as to ensure that the rotor blades 30 rotate about their longitudinal axis 31 in synchronism with the rotation of the rotor blades 30 through 360° along the peripheral surface 71 of a circular cone 70. In the case of the prior art, the aforementioned design requirements disadvantageously result in a comparatively large structure of a hub 10 comprising such a timing gear 50. Moreover, arranging a plurality of large gearwheels 51, 52, 53 in a comparatively small hub 10 is often economically unfeasible and technically demanding and, in some configurations, even technically impossible.

Figure 20:
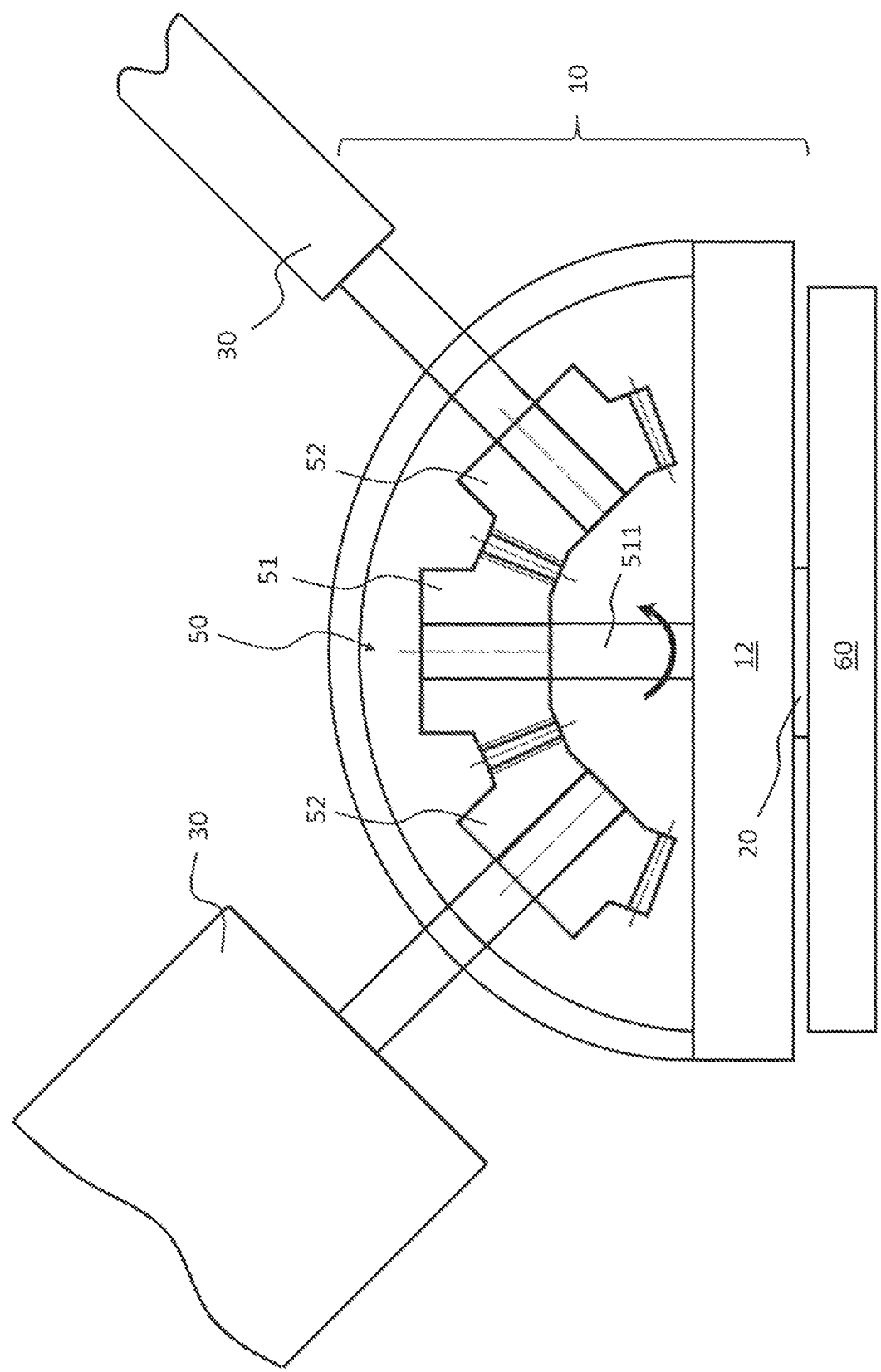
FIG. 20 shows, in a sectional representation, a refinement of a propeller according to the invention with a timing gear in an "inner configuration"

In contrast, FIG. 20 shows a sectional representation of a refinement of a propeller 1 according to the invention with a timing gear 50 in a so-called "inner configuration".

As can be seen, the hub 10 comprises a timing gear 50 that enables the rotor blades 30 to be rotated about their longitudinal axis 31. Arranged on each rotor blade 30 there is a gearwheel 52 that is directly operatively connected to a reference gearwheel 51 of the timing gear 50. In contrast to the prior art, a directional wheel 53 is advantageously not necessary here. The timing gear 50 is operatively connected to a hub gear 12, the hub gear 12 being configured to sense and process an angular velocity $\omega_n$ of a rotational movement of the hub 10. The operative connection between the timing gear 50 and the hub gear 12 may be realized in various ways, in the present example the reference gearwheel 51 of the timing gear 50 being operatively connected to the hub gear 12, in particular to one of the gearwheels of the hub gear 12, via a connecting element 511. The hub gear 12 may preferably be designed as a planetary gear or as a simple toothed gear.

In the "inner configuration" of the timing gear 50 represented here, the reference gearwheel 51 is arranged centrally in the timing gear 50 and surrounded by the gearwheels 52 of the rotor blades 30.

According to the invention, the reference gearwheel 51 and the gearwheels 52 of the rotor blades 30 are designed in such a way that the ratio of an angular velocity $\omega_r$ of the reference gearwheel 51 to the angular velocity $\omega_n$ of the rotational movement of the hub 10 is as follows:

$$\omega_r/\omega_n = 1 \pm (1/2)*(S_{rot}/S_r),$$

where $S_{rot}$=size of the gearwheels 52 of the rotor blades 30, and $S_r$=size of the reference gearwheel 51.

In the case of the "inner configuration" of the timing gear 50 represented here, the reference gearwheel 51 and the gearwheels 52 of the rotor blades 30 are preferably designed in such a way that the ratio of an angular velocity $\omega_r$ of the reference gearwheel 51 to the angular velocity $\omega_n$ of the rotational movement of the hub 10 is as follows:

$$\omega_r/\omega_n = 1 + (1/2)*(S_{rot}/S_r),$$

where $S_{rot}$=size of the gearwheels 52 of the rotor blades 30, and $S_r$=size of the reference gearwheel 51.

The following table shows examples of various gearwheel size combinations, the angular velocity $\omega_r$ of the reference gearwheel 51 calculated using the previously stated variant of the formula according to the invention, and the maximum possible number of rotor blades 30 that can be arranged on the hub 10 with the respective combination. The angular velocity $\omega_n$ of the rotational movement of the hub 10 is set in this case to the value 1 (the value of $\omega_r$ therefore represents the relative velocity with respect to $\omega_n$).

| $S_{rot}$ | $S_r$ | $\omega_r$ | Maximum possible number of rotor blades 30 |
|---|---|---|---|
| 2 | 1 | 2 | 3-4 |
| 3 | 2 | 1.75 | 3-4 |
| 1 | 1 | 1.5 | 4-5 |
| 2 | 3 | 1.3333 | 6-8 |
| 1 | 2 | 1.25 | 8-10 |
| 1 | 3 | 1.1666 | 10-16 |
| 1 | 4 | 1.125 | 16-20 |
| 2 | 5 | 1.2 | 18-22 |
| 1 | 5 | 1.1 | 20-25 |

According to the table, for example, a size ratio $S_{rot}/S_r$ of 1:1 results in an angular velocity $\omega_r$ of the reference gearwheel 51 of 1.5 relative to the angular velocity $\omega_n$ of the rotational movement of the hub 10, which can be technically accommodated by the selection of a correspondingly designed hub gear 12. In the case of this above-mentioned design of the timing gear 50 in the "inner configuration", and of the hub gear 12 and their interaction, which can be calculated by means of the formula according to the invention, for example a maximum of 4 to 5 rotor blades 30 could then be arranged on the hub 10.

The above table in this case represents only some of the theoretically possible combinations, such that, advantageously, the design of the timing gear 50 may be freely selected according to the application.

Figure 21:
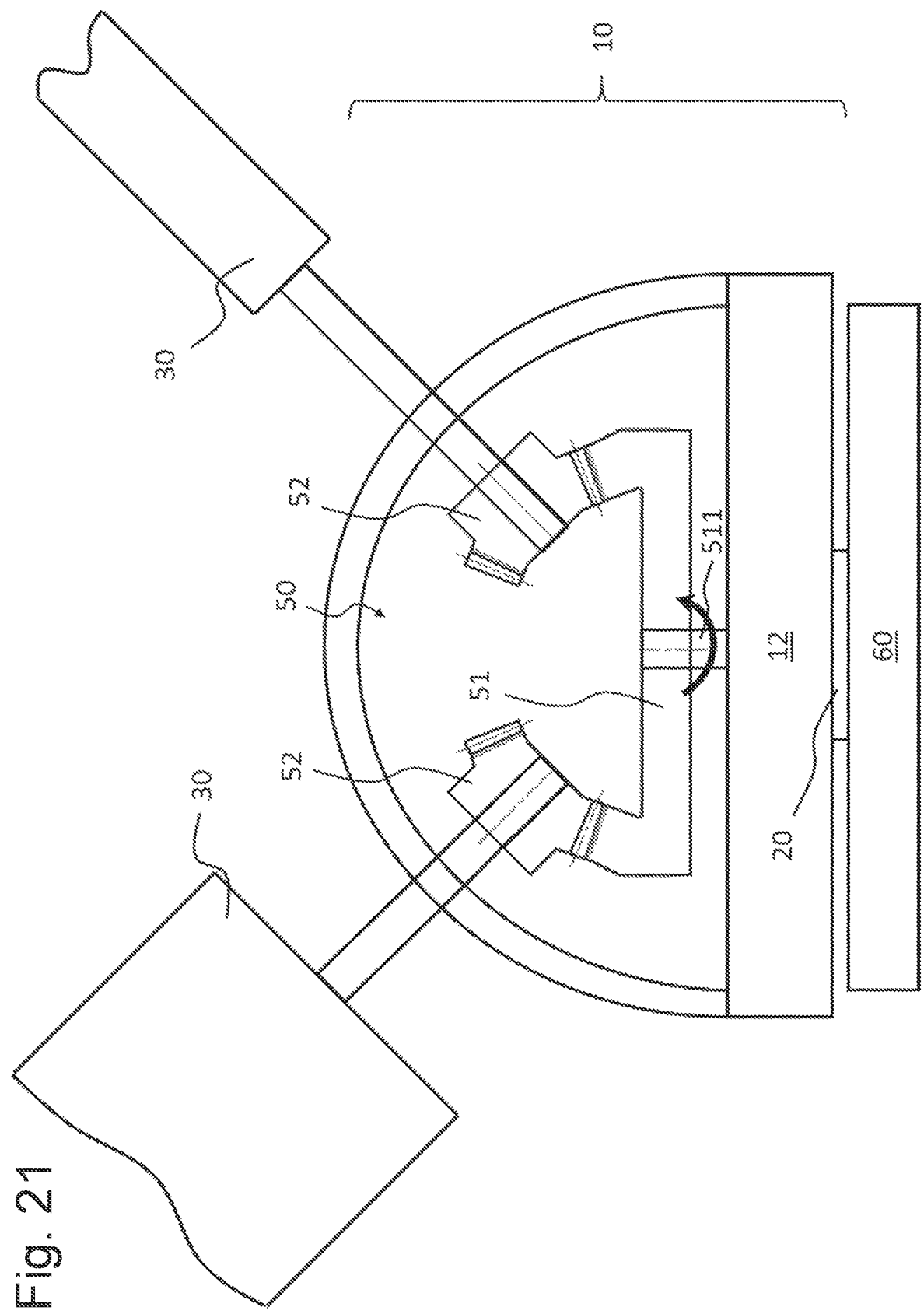
FIG. 21 shows, in a sectional representation, a refinement of a propeller according to the invention with a timing gear in an "outer configuration".

Finally, FIG. 21 shows a sectional view of a refinement of a propeller 1 according to the invention with a timing gear 50 in an "outer configuration".

The difference compared to the "inner configuration" represented in FIG. 20 is that here the reference gearwheel 51, preferably realized as a planetary wheel, a ring gear or a crown wheel, is arranged outside the center of the timing gear 50 and in turn surrounds the gearwheels 52 of the rotor blades 30. With regard to the structure, what is described for FIG. 20 also applies accordingly to this refinement. The reference gearwheel 51 and the gearwheels 52 of the rotor blades 30 are in this case preferably designed in such a way that the ratio of an angular velocity $\omega_r$ of the reference gearwheel 51 to the angular velocity $\omega_n$ of the rotational movement of the hub 10 is as follows:

$$\omega_r/\omega_n = 1 - (1/2)*(S_{rot}/S_r),$$

where $S_{rot}$=size of the gearwheels 52 of the rotor blades 30, and $S_r$=size of the reference gearwheel 51.

The following table shows examples of various gearwheel size combinations, the angular velocity $\omega_r$ of the reference gearwheel 51 calculated using the previously stated variant of the formula according to the invention, and the maximum possible number of rotor blades 30 that can be arranged on the hub 10 with the respective combination. The angular velocity $\omega_n$ of the rotational movement of the hub 10 is set in this case to the value 1 (the value of $\omega_r$ therefore represents the relative velocity with respect to $\omega_n$).

| $S_{rot}$ | $S_r$ | $\omega_r$ | Maximum possible number of rotor blades 30 |
|---|---|---|---|
| 1 | 12 | 0.9853 | 12-16 |
| 1 | 10 | 0.95 | 10-12 |
| 1 | 8 | 0.9375 | 8-10 |
| 1 | 6 | 0.9166 | 6-8 |
| 1 | 5 | 0.9 | 5-7 |
| 1 | 4 | 0.875 | 4-6 |
| 1 | 3 | 0.8333 | 3-4 |
| 2 | 5 | 0.8 | 2-3 |
| 1 | 2 | 0.75 | 1-2 |
| 2 | 1 | 0.00 | 0 |

According to the table, for example, a size ratio $S_{rot}/S_r$ of 1:4 results in an angular velocity $\omega_r$ of the reference gearwheel 51 of 0.875 relative to the angular velocity $\omega_n$ of the rotational movement of the hub 10, which can be technically accommodated by the selection of a correspondingly designed hub gear 12. In the case of this above-mentioned design of the timing gear 50 in the "outer configuration", and of the hub gear 12 and their interaction, which can be calculated by means of the formula according to the invention, for example a maximum of 4 to 6 rotor blades 30 could then be arranged on the hub 10.

The combination, listed in the last line of the above table, of a gearwheel 52 of a rotor blade 30 that is twice as large as the size $S_r$ of the reference gearwheel 51, would not be physically (technically) feasible at all in the case of a timing gear 50 of the prior art (cf. FIG. 19), and could at most be realized with a chain drive or with a toothed belt drive.

The above table in this case again represents only some of the theoretically possible combinations, such that, advantageously, in the case of the "outer configuration" also, the design of the timing gear 50 may be freely selected according to the application.

The present invention relates to a novel universal propeller 1 that is distinguished from generic propellers 1 by the fact that arranged on each rotor blade 30 there is a gearwheel 52 that is directly operatively connected to a reference gearwheel 51 of the timing gear 50, the timing gear 50 is operatively connected to a hub gear 12, wherein the hub gear 12 is configured to sense and process an angular velocity $\omega_n$ of a rotational movement of the hub 10, and the reference gearwheel 51 and the gearwheels 52 of the rotor blades 30 of the timing gear 50 are designed in such a way that the ratio of an angular velocity $\omega_r$ of the reference gearwheel 51 to the angular velocity $\omega_n$ of the rotational movement of the hub 10 is as follows: $\omega_r/\omega_n = 1 \pm (\frac{1}{2})*(S_{rot}/S_r)$, where $S_{rot}$=size of the gearwheels 52 of the rotor blades 30, and $S_r$=size of the reference gearwheel 51.

The present invention is suitable, in particular, for use in a wind power installation, hydropower installation or an engine of a ship or an aircraft.

LIST OF REFERENCES 1 universal propeller
10 hub
11 central axis of the hub 10
12 hub gear
20 shaft
21 central axis of the shaft 20
30 rotor blade
31 longitudinal axis of the rotor blade 30
32 upper sides of the rotor blade 30
33 side edges of the rotor blade 30
34 rotor blade tip
35 stiffening
40 cable
50 timing gear
51 reference gearwheel
511 connecting element
52 gearwheel of a rotor blade (30)
53 direction wheel (only in the prior art)
60 generator
70 circular cone
71 peripheral surface of the circular cone 70
72 vertex of the circular cone 70
73 circular disk of the circular cone 70
80 base
81 mast
82 building
821 facade
822 pitched roof
823 flat roof
83 body of water
831 bed of body of water
832 surface of water
84 bearing
85 bearing mast
86 bridge
861 bridge pier
862 bridge element
87 ship
88 energy kite
89 aircraft
90 motor
A lift component
W drag component
T1, T2, T3, T4 transit points
$\alpha$ angle between longitudinal axis 31 and central axis 21 in the three-dimensional coordinate system of the universal propeller 1
$\beta$ angle between central axis 21 of the shaft 20 and a horizontal X in the mounting coordinate system of the universal propeller 1
xyz three-dimensional coordinate system of the universal propeller 1
x first direction of a horizontal plane
y second direction of a horizontal or vertical plane
z first direction of a vertical plane
X, Y, Z mounting coordinates of the universal propeller 1
X horizontal
Y horizontal (perpendicular to X)
Z vertical

The invention claimed is:

1. A universal propeller, comprising:
a hub rotatably mounted on a shaft, said shaft having a central axis;
a plurality of rotor blades mounted to said hub, said rotor blades being: two rotor blades arranged opposite one another, or at least three rotor blades arranged in a star configuration with respect to one another;
each of said rotor blades on said hub being arranged, at an end of a longitudinal axis thereof, at an angle $\alpha$ with respect to said central axis of said shaft such that the longitudinal axis of each rotor blade, when rotating through 360°, describes a peripheral surface of a right circular cone;
said hub having a timing gear enabling said rotor blades to be rotated about the longitudinal axes of said rotor blades, said timing gear having a reference gearwheel;
each of said rotor blades carrying a gearwheel that is directly operatively connected to said reference gearwheel of said timing gear;
said timing gear being operatively connected to a hub gear that is configured to sense and process an angular velocity $\omega_n$ of a rotational movement of said hub; and
wherein said reference gearwheel is arranged centrally in said timing gear and surrounded by said gearwheels of said the rotor blades, and said reference gearwheel and said gearwheels of said rotor blades are configured to define a ratio of the angular velocity $\omega_r$ of said reference gearwheel to the angular velocity $\omega_n$ of the rotational movement of said hub that is: $\omega_r/\omega_n = 1+(\frac{1}{2})*(S_{rot}/S_r)$; or wherein said reference gearwheel is arranged outside a center of said timing gear and surrounds said gearwheels of said rotor blades, and said reference gearwheel and said gearwheels of said rotor blades are configured to define a ratio of the angular velocity $\omega_r$ of said reference gearwheel to the angular velocity $\omega_n$ of the rotational movement of said hub that is:
$\omega_r/\omega_n = 1-(1/2)*(S_{rot}/S_r)$;
wherein $S_{rot}$ is a size of said gearwheels of said rotor blades and $S_r$ is a size of said reference gearwheel.

2. The universal propeller according to claim 1, wherein said reference gearwheel is selected from the group consisting of a planetary wheel, a ring gear, and a crown wheel.

3. The universal propeller according to claim 1, wherein the longitudinal axis of each rotor blade is arranged at the angle α selected from the group consisting of:
between 30° and 60°;
between 35° and 55°;
between 40° and 50°; and
45°;
with respect to said central axis of said shaft.

4. The universal propeller according to claim 1, wherein, when said hub rotates about said shaft, each rotor blade is in alignment at a first transit point with a perpendicular plane of a three-dimensional coordinate system relating to the universal propeller.

5. The universal propeller according to claim 4, wherein, at the first transit point, the longitudinal axis of each said rotor blade may have a vertical deviation of up to +/−15° within the perpendicular plane.

6. The universal propeller according to claim 1, wherein, when said hub rotates about said shaft, each rotor blade is in alignment at a third transit point with a horizontal plane of a three-dimensional coordinate system relating to the universal propeller.

7. The universal propeller according to claim 6, wherein, at the third transit point, the longitudinal axis of each said rotor blade may have a horizontal deviation of up to +/−15° outside the horizontal plane.

8. The universal propeller according to claim 1, wherein each rotor blade, at least in part, has two substantially flat upper sides.

9. The universal propeller according to claim 8, which further comprises solar cells arranged on the flat upper sides of each rotor blade.

10. The universal propeller according to claim 1, wherein each said rotor blade is formed with rounded or conical lateral edges.

11. The universal propeller according to claim 1, wherein mutually adjacent and/or mutually opposite said rotor blades are connected to each other by way of cables that are attached to said rotor blades between a central and an end position.

12. The universal propeller according to claim 11, wherein said cables are attached in a region of or adjacent to respective rotor blade tips.

13. The universal propeller according to claim 1, wherein said central axis of said shaft is arranged at an angle of between 0° and 360°, with respect to a horizontal of a mounting coordinate system relating to the universal propeller.

14. The universal propeller according to claim 13, wherein said central axis of said shaft encloses an angle of 45° with the horizontal of the mounting coordinate system.

15. A method of operating a propeller, the method comprising:
providing a universal propeller according to claim 1; and
effecting, by way of the timing gear, a rotation of the rotor blades about the longitudinal axes of the rotor blades in synchronism with a rotation of the rotor blades through 360° along the peripheral surface of the circular cone.

16. The method according to claim 15, wherein a rotational speed of the rotor blades about the longitudinal axis of the rotor blades is half a rotational speed of the rotor blades through 360° along the peripheral surface of the circular cone.

17. In combination with a wind power installation, a hydropower installation, an engine of a ship, or an engine of an aircraft, the universal propeller according to claim 1.

* * * * *